3,135,749
MALEIMIDE ADDUCT OF LEVOPIMARIC ACID AND DERIVATIVES
Raymond O. Clinton, East Greenbush, and Andrew John Manson, North Greenbush, N.Y., assignors to Sterling Drug Inc., New York, N.Y., a corporation of Delaware
No Drawing. Filed Apr. 14, 1960, Ser. No. 22,108
20 Claims. (Cl. 260—247.2)

This invention relates to novel resin acid derivatives, and in particular is concerned with the maleimide adduct of levo-pimaric acid further substituted on the nitrogen atom by a tertiary-amino-lower-alkyl group, with certain transformation products thereof, and with processes for the preparation of the new compounds.

A preferred class of compounds of the invention comprises those having the formula

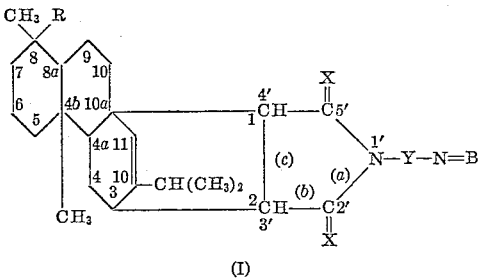

(I)

wherein R represents carboxy, carbo-lower-alkoxy ($-CO_2$-alkyl), hydroxymethyl or carboxylic acyloxymethyl ($-CH_2-O$-acyl); X represents two hydrogen atoms ($H_2$) or an oxygen atom (O); Y represents lower-alkylene; and N=B represents tertiary-amino. In the carbo-lower-alkoxy groups the alkyl group preferably has from one to about six carbon atoms, and in the carboxylic acyloxymethyl groups the acyl group preferably has from one to about ten carbon atoms.

The compounds of the above Formula I can be named systematically as derivatives of phenanthro[1,2-c]pyrrolidine, viz.: 8 - R - 4b,8 - dimethyl - 12 - isopropyl-1,2,3,4,4a,4b,5,6,7,8,8a,9,10,10a - tetradecahydro - 3,10a-ethenophenanthro[1,2-c] - 1' - (tertiary - amino - lower-alkyl)-2',5'-$X_2$-pyrrolidine.

In the above general Formula I, R represents carboxy, carbo-lower-alkoxy, hydroxymethyl or carboxylic acyloxymethyl. The carbo-lower-alkoxy radicals have the formula $-CO_2$-lower-alkyl in which the lower-alkyl groups have from one to about six carbon atoms and can be straight or branched, thus including such groups as carbomethoxy, carbethoxy, carbopropoxy, carbo-isopropoxy, carbobutoxy, carbopentoxy, carbohexoxy, and the like. The carboxylic acyloxymethyl radicals have the formula $-CH_2-O$-acyl in which the carboxylic acyloxy groups are preferably derived from carboxylic acids having from one to about ten carbon atoms, and having a molecular weight less than about 200. Representative of the carboxylic acyloxymethyl radicals which can be present are lower-alkanoyloxymethyl radicals, e.g., formyloxymethyl, acetoxymethyl, propionyloxymethyl, butryloxymetyl, isobutyryloxymethyl, caproyloxymethyl, heptanoyloxymethyl, octanoyloxymethyl, trimethylacetoxymethyl, and the like; carboxy-lower-alkanoloxymethyl radicals, e.g., succinyloxymethyl ($\beta$-carboxypropionyloxymethyl); cycloalkyl-lower-alkanoyloxymethyl radicals, e.g., $\beta$-cyclopentylpropionyloxymethyl, $\beta$-cyclohexylpropionyloxymethyl, and the like; monocarbocyclic aroylmethyl radicals, e.g., benzoyloxymethyl, p-toluyloxymethyl, p-nitrobenzoyloxymethyl, 3,4,5-trimethoxybenzoyloxymethyl, and the like; monocarbocyclic aryl-lower-alkanoyloxymethyl or alkenoyloxymethyl radicals, such as phenylacetoxymethyl, $\beta$-phenylpropionyloxymethyl, cinnamoyloxymethyl, and the like; and monocarbocyclic aryloxy-lower-alkanoyloxymethyl radicals, such as p-chlorophenoxyacetoxymethyl, and the like.

In the above general Formula I, N=B represents a tertiary-amino radical. By a tertiary-amino radical is meant a radical of the type YY'N— wherein Y and Y' are both organic substituents so that the complete molecule to which it is attached is a tertiary-amine. The tertiary-amino radical is preferably basic and has a molecular weight less than about 200. Basic tertiary-amino radicals are those of the aliphatic or araliphatic type that impart to the molecules which contain them sufficient basicity so that the compounds readily form acid-addition salts with strong inorganic and organic acids. A particularly preferred group of tertiary-amino radicals are di-lower-alkylamino, for example, dimethylamino, diethylamino, dibutylamino, methylethylamino, and the like; dicycloalkylamino in which the cycloalkyl has from 5 to 6 ring members, for example, dicyclopentylamino, dicyclohexylamino, bis(4-methylcyclohexyl)amino, and the like; N-(cycloalkyl)-N-lower-alkylamino in which the cycloalkyl has from 5 to 6 ring members, for example, N-(cyclohexyl)-N-methylamino, N-(cyclopentyl)-N-ethylamino, and the like; polymethylenimino having from 5 to 7 ring members, for example, 1-pyrrolidyl, 1-piperidyl, hexamethylenimino and lower-alkylated derivatives thereof; 4-morpholinyl; 1-piperazinyl; 4-hydrocarbon-1-piperazinyl in which the hydrocarbon has from 1 to 10 carbon atoms, for example, 4-methyl-1-piperazinyl, 4-phenyl-1-piperazinyl, and the like; di-(phenyl-lower-alkyl)amino, for example, dibenzylamino, bis(phenylethyl)amino, and the like; and N-(phenyl-lower-alkyl)-N-lower-alkylamino, for example, N-benzyl-N-methylamino N-phenylethyl-N-ethylamino, and the like. In the foregoing radicals, the term lower-alkyl stands for alkyl groups containing from one to about six carbon atoms.

In the above general Formula I, Y stands for a lower-alklylene bridge, having from at least two to about five carbon atoms, in which the points of attachment to the remainder of the molecule are on different carbon atoms. In other words, the two nitrogen atoms of the molecule are separated by at least two carbon atoms. The lower-alkylene bridge can be straight or branched and includes such groupings as $-CH_2CH_2-$, $-CH_2CH(CH_3)-$, $-CH(CH_3)CH_2-$, $-CH_2CH_2CH_2-$

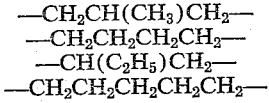

and

The compounds of Formula I wherein R represents carboxy or carbo-lower-alkoxy and X represents O are prepared by causing maleopimaric acid or a lower-alkyl ester thereof to react with a tertiary-amino alkylamine of the formula $H_2N-Y-N=B$, wherein Y and N=B have the meanings given hereinabove. The process is carried out by heating approximately equimolar quantities of the reactants at a temperature between about 50° C. and 150° C. in an inert organic solvent, preferably with means for removing the water formed in the reaction.

The compounds of Formula I wherein R represents hydroxymethyl and X represents $H_2$ are prepared by causing a compound of Formula I wherein R represents carboxy or carbo-lower-alkoxy and X represents O to react with lithium aluminum hydride. The process is carried out by mixing the imido acid or ester with an excess of lithium aluminum hydride suspended in an inert organic solvent at a temperature between about 20° C. and 100° C.

In order to obtain selectively reduced compounds of

Formula I wherein R represents hydroxymethyl and X represents O, the compounds of Formula I wherein R represents carbo-lower-alkoxy and X represents O can be reduced by the Bouveault-Blanc method, i.e., by the action of sodium in lower-alkanol solution. In this process the carbo-lower-alkoxy group is reduced to hydroxymethyl whereas the imide carbonyl groups are not affected. An alternative method for accomplishing the same transformation involves converting a compound of Formula I wherein R represents carboxy and X represents O to the acid chloride by treating it with thionyl chloride, oxalyl chloride or a like reagent, and then causing the acid chloride to react with sodium borohydride. The acid chloride grouping is reduced to hydroxymethyl, but the imide carbonyl groups are not reduced by sodium borohydride.

In order to obtain compounds of Formula I wherein R represents carboxy and X represents $H_2$, the compounds wherein R represents hydroxymethyl and X represents $H_2$ can be oxidized by methods known to oxidize primary alcohols to the corresponding carboxylic acids. Such methods comprise treating the alcohol with a sulfuric-chromic acid mixture or with acid or alkaline permanganate solution at room temperature or below. If it is desired to obtain lower-alkyl esters of the resulting carboxy compounds, these can be obtained by conventional esterification procedures, for example, by reacting the acid and a lower-alkanol in the presence of a strong acid catalyst, by the action of a lower-alkyl halide on a salt of the acid, from the acid chloride and a lower-alkanol, or, in the case of the methyl ester, by reacting the acid with diazomethane.

The compounds of Formula I wherein R represents carboxylic acyloxymethyl are prepared from the corresponding hydroxymethyl compounds by esterification procedures, for example, by causing the hydroxymethyl compound to react with the appropriate acid anhydride or acid halide.

The compounds of Formula I are basic in character, those where X is O having one basic center and those where X is $H_2$ having two basic centers. The compounds where X is O thus form mono-acid-addition salts upon addition of strong acids and mono-quaternary ammonium salts upon addition of esters of strong acids. The compounds where X is $H_2$ form mono- or di-acid-addition salts and mono- or di-quaternary ammonium salts. The salts are the full equivalent of the corresponding free bases insofar as their physiological properties are concerned. Both the free base and salt forms are considered to be one and the same invention.

The acid-addition salts are prepared by causing the free base to react with a strong inorganic or organic acid, usually in an inert solvent or reaction medium. Examples of appropriate acids include hydrochloric, hydrobromic, sulfuric, phosphoric, citric, tartaric, quinic, benzenesulfonic acid, and the like.

The quaternary ammonium salts of the compounds of the invention are prepared by causing a free base to react with an ester of a strong inorganic or organic sulfonic acid, said ester preferably having a molecular weight less than about 200. A particularly preferred class of esters, because of their ready availability, are lower-alkyl, lower-alkenyl and monocarbocyclic aryl-lower-alkyl esters, for example, methyl iodide, ethyl iodide, ethyl bromide, propyl bromide, butyl bromide, allyl bromide, methyl sulfate, methyl benzenesulfonate, methyl p-toluenesulfonate, benzyl chloride, o-chlorobenzyl chloride, and the like. The reaction of the free base and the quaternizing agent takes place upon simple admixture of the components, preferably in the presence of an inert organic solvent, although heating may be applied to accelerate the reaction.

The acid-addition and quaternary ammonium salts preferably have anions which are pharmacologically acceptable, that is, the anions do not appreciably increase the toxicity of the compound as a whole toward animal organisms. Such anions include, for example, the chloride, bromide, iodide, sulfate or acid sulfate, methanesulfonate, benzenesulfonate, and the like. Salts having toxic anions are, however, useful in that they serve as characterizing derivatives of the free base and serve as intermediates for non-toxic quaternary salts by conventional ion exchange reactions. All acid-addition salts, regardless of the nature of the anions, are useful as intermediates in the purification of the free bases.

The compounds of the invention wherein R in Formula I above is carboxy are acidic as well as basic in nature and will also form salts upon reacting them with strong bases, such as metal oxides or hydroxides, ammonia or organic amines. These salts are useful as characterizing derivatives of the free bases and/or intermediates in the preparation of esters (R is carbo-lower-alkoxy).

Pharmacological evaluation of the compounds of the invention has shown that they possess hypotensive and coronary dilator activity when administered to animal organisms in non-toxic doses. The new compounds are thus useful in lowering blood pressure and alleviating the work load on the heart. The are administered either subcutaneously in the form of a sterile, isotonic aqueous solution or suspension, or orally in the form of tablets, powder or aqueous dispersions. The compounds are formulated in conventional fashion using an appropriate amount of the active ingredient or a salt thereof with ordinary pharmaceutical excipients.

The structure of the compounds of the invention was established by the mode of synthesis, by infrared spectral data, and by the fact that elementary analyses were in agreement with the assigned structures.

The following examples will further illustrate the invention without the latter being limited thereby.

EXAMPLE 1

*8 - Carboxy-4b,8-Dimethyl-12-Isopropyl-1,2,3,4,4a,4b,5,6, 7,8,8a,9,10,10a - Tetradecahydro - 3,10a-Ethenophenanthro[1,2-c]-1'-(2-Diethylaminoethyl)-2',5'-Pyrrolidinedione*

[I; R is COOH, X is O, Y is $CH_2CH_2$, N=B is $N(C_2H_5)_2$]

2-diethylaminoethylamine (7.0 g., 0.06 mole) was added to a solution of 24.0 g. (0.06 mole) of maleopimaric acid in 300 ml. of benzene, and the mixture was refluxed for four hours under a water trap. The reaction mixture was then cooled and the benzene removed in vacuo on a steam bath. The residue was crystallized from 200 ml. of ethyl acetate to give two crops of crystalline product, 14.80 g., M.P. 170–172° C. (uncorr.) and 5.95 g., M.P. 167–171° C. (uncorr.) The total product was recrystallized from acetone and again from ethyl acetate and dried at 85° C. in vacuo for six hours to give 8-carboxy-4b,8-dimethyl - 12 - isopropyl-1,2,3,4,4a,4b,5,6,7,8,8a,9,10,10a-tetradecahydro - 3,10a-ethenophenanthro[1,2-c]-1'-(2-diethylaminoethyl) - 2',5' - pyrrolidinedione, M.P. 168.2–169.4° C. (corr.), $[\alpha]_D^{25} = +17.6° \pm 0.3°$ (1% in chloroform); infrared maxima at 5.65 and 5.88μ.

*Analysis.*—Calcd. for $C_{30}H_{46}N_2O_4$: C, 72.25; H, 9.30; O, 12.83. Found: C, 72.35; H, 9.65; O, 12.80.

8-carboxy-4b,8-dimethyl - 12-isopropyl - 1,2,3,4,4a,4b, 5,6,7,8,8a,9,10,10a-tetradecahydro-3,10a - ethenophenanthro[1,2-c]-1'-(2-diethylaminoethyl) - 2',5' - pyrrolidinedione is obtained in the form of its hydrofluoride, hydrobromide, hydriodide, sulfate (or bisulfate), phosphate (or acid phosphate), acetate, tartrate (or bitartrate), lactate, citrate (or acid citrate), benzenesulfonate, ethanesulfonate, methiodide, allobromide or benzochloride salt, when contacted, respectively, with hydrofluoric acid, hydrobromic acid, hydriodic acid, sulfonic acid, phosphoric acid, acetic acid, tartaric acid, lactic acid, citric acid, benzenesulfonic acid, ethanesulfonic acid, methyl iodide, allyl bromide or benzyl chloride.

8-carboxy-4b,8-dimethyl - 12-isopropyl - 1,2,3,4,4a,4b, 5,6,7,8,8a,9,10,10a-tetradecahydro-3,10a - ethenophenanthro[1,2-c]-1'-(2-diethylaminoethyl) - 2',5' - pyrrolidinedione in the form of its hydrofluoride salt can be converted to the hydrochloride salt by passing an aqueous solution of the former over an ion-exchange resin saturated with chloride ion.

8-carboxy-4b,8-dimethyl - 12-isopropyl - 1,2,3,4,4a,4b, 5,6,7,8,8a,9,10,10a-tetradecahydro-3,10a - ethenophenanthro[1,2-c]-1'-(2-diethylaminoethyl) - 2',5' - pyrrolidinedione reacts in aqueous solution with sodium hydroxide, potassium hydroxide, calcium chloride or silver nitrate to give, respectively, the sodium, potassium, calcium or silver salt of said 8-carboxy compound. Said silver salt can be caused to react with methyl iodide, ethyl iodide, isopropyl bromide or isoamyl bromide to give, respectively, the methyl ester, ethyl ester, isopropyl ester or isoamyl ester of 8-carboxy-4b,8-dimethyl-12-isopropyl-1,2,3,4,4a,4b,5,6,7,8,8a,9,10,10a - tetradecahydro - 3,10a-ethenophenanthro[1,2 - c] - 1' - (2 - diethylaminoethyl)-2',5'-pyrrolidinedione.

8-carboxy-4b,8-dimethyl - 12-isopropyl - 1,2,3,4,4a,4b, 5,6,7,8,8a,9,10,10a-tetradecahydro-3,10a - ethenophenanthro[1,2-c]-1'-(2-diethylaminoethyl) - 2',5' - pyrrolidinedione in the form of its hydrochloride salt was found to have a minimum effective hypotensive dose of about 0.01 mg./kg. of body weight when injected subcutaneously into renal hypertensive rats and measured by the photoelectric foot method of Kersten et al., J. Lab. Clin. Med. 32, 1090 (1947). The intravenous toxicity ($LD_{50}$) in the mouse was found to be 80±7.0 mg./kg.

EXAMPLE 2

8-carboxy-4b,8-dimethyl - 12-isopropyl - 1,2,3,4,4a,4b, 5,6,7,8,8a,9,10,10a-tetradecahydro-3,10a - ethenophenanthro[1,2 - c] - 1' - [2 - (4-morpholinyl)ethyl]-2'-,5'-pyrrolidinedione [I; R is COOH, X is O, Y is $CH_2CH_2$, N=B is $N(CH_2)_4O$] was prepared from 7.31 g. of 2-(4-morpholinyl)ethylamine and 18.67 g. of maleopimaric acid in 250 ml. of benzene according to the manipulative procedure described above in Example 1. There was thus obtained 18.0 g. of 8-carboxy-4b,8-dimethyl-12-isopropyl - 1,2,3,4,4a,4b,5,6,7,8,8a,9,10,10a - tetradecahydro-3,10a-ethenophenanthro[1,2-c]-1' - [2 - (4 - morpholinyl) ethyl] - 2',5' - pyrrolidinedione, M.P. 203.0–204.0° C. (corr.), $[\alpha]_D^{25}=-32.9°\ \pm 0.2°$ (1% in chloroform) when recrystallized from ethyl acetate and dried at 60° C. for forty-eight hours in vacuo.

Analysis.—Calcd. for $C_{30}H_{44}N_2O_5$: C, 70.28; H, 8.65; N, 5.46; O, 15.60. Found: C, 70.33; H, 8.38; N, 5.48; O, 15.30.

EXAMPLE 3

8-carboxy-4b,8-dimethyl - 12-isopropyl - 1,2,3,4,4a,4b, 5,6,7,8,8a,9,10,10a-tetradecahydro-3,10a - ethenophenanthro[1,2-c]-1'-(3-hexamethyleniminopropyl) - 2',5' - pyrrolidinedione [I; R is COOH, X is O, Y is $CH_2CH_2CH_2$, N=B is $N(CH_2)_6$] was prepared from 25.78 g. of 3-hexamethyleniminopropylamine and 60.08 g. of maleopimaric acid in 600 ml. of benzene according to the manipulative procedure described above in Example 1. There was thus obtained 68.4 g. of 8-carboxy-4b,8-dimethyl - 12 - isopropyl- 1,2,3,4,4a,4b,5,6,7,8,8a,9,10,10a-tetradecahydro - 3,10a - ethenophenanthro[1,2 - c] - 1'-(3-hexamethyleniminopropyl) - 2',5' - pyrrolidinedione, M.P. 197.6–201.8° C. (corr.), $[\alpha]_D^{24}=-24.8°\ \pm 0.1°$ (1% in chloroform) when recrystallized from ethyl acetate and dried at 65–72° C. for nineteen hours in vacuo.

Analysis.—Calcd. for $C_{33}H_{50}N_2O_4$: C, 73.56; H, 9.35; N, 5.20. Found: C, 73.43; H, 9.20; N, 5.11.

8-carboxy-4b,8-dimethyl - 12-isopropyl - 1,2,3,4,4a,4b, 5,6,7,8,8a,9,10,10a-tetradecahydro-3,10a - ethenophenanthro[1,2-c]-1'-(3-hexamethyleniminopropyl) - 2',5' - pyrrolidinedione in the form of its hydrochloride salt was found to have a minimum effective hypotensive dose of about 0.01 mg./kg. of body weight when injected subcutaneously into renal hypertensive rats and measured by the photoelectric foot method of Kersten et al., loc. cit. The intravenous toxicity ($ALD_{50}$) in the mouse was found to be 120 mg./kg.

EXAMPLE 4

8-carboxy-4b,8-dimethyl - 12-isopropyl - 1,2,3,4,4a,4b, 5,6,7,8,8a,9,10,10a-tetradecahydro-3,10a - ethenophenanthro[1,2-c] - 1' - (3 - dimethylaminopropyl) - 2',5' - pyrrolidinedione [I; R is COOH, X is O, Y is $CH_2CH_2CH_2$, N=B is $N(CH_3)_2$] was prepared from 11.24 g. of 3-dimethylaminopropylamine and 40.05 g. of maleopimaric acid in 500 ml. of benzene according to the manipulative procedure described above in Example 1. The product was leached with hot ethyl acetate and the ethyl acetate insoluble portion was recrystallized from ethanol and dried for eighteen hours at 50° C. in vacuo to give 35.72 g. of 8-carboxy-4b,8-dimethyl-12-isopropyl-1,2,3,4,4a,4b, 5,6,7,8,8a,9,10,10a-tetradecahydro-3,10a - ethenophenanthro[1,2-c]-1'-(3-dimethylaminopropyl)-2',5'-pyrrolidinedione, M.P. 237.4–241.0° C. (corr.), $[\alpha]_D^{25}=-21.8°$ (1% in chloroform).

Analysis.—Calcd. for $C_{29}H_{44}N_2O_4$: N, 5.78; O, 13.21. Found: N, 5.72; O, 13.20.

8-carboxy-4b,8-dimethyl - 12-isopropyl - 1,2,3,4,4a,4b, 5,6,7,8,8a,9,10,10a-tetradecahydro-3,10a - ethenophenanthro[1,2-c] - 1' - (3 - dimethylaminopropyl) - 2',5' - pyrrolidinedione in the form of its hydrochloride salt was found to have a minimum effective hypotensive dose of about 0.10 mg./kg. of body weight when injected subcutaneously in renal hypertensive rats and measured by the photoelectric foot method of Kersten et al., loc. cit. The intravenous toxicity ($ALD_{50}$) in the mouse was found to be 125 mg./kg.

EXAMPLE 5

8 - carboxy-4b,8-dimethyl-12-isopropyl-1,2,3,4,4a,4b,5, 6,7,8,8a,9,10,10a - tetradecahydro - 3,10a-ethenophenanthro[1,2 - c] - 1'-[3-(1-pyrrolidyl)propyl]-2',5'-pyrrolidinedione [I; R is COOH, X is O, Y is $CH_2CH_2CH_2$, N=B is $N(CH_2)_4$] was prepared from 8.08 g. of 3-(1-pyrrolidyl)propylamine and 24.03 g. of maleopimaric acid in 300 ml. of benzene according to the manipulative procedure described above in Example 1. The crude product was dissolved in about 1 liter of chloroform, hot ethyl acetate was added until the total volume was 1600–1800 ml., and the solution was then concentrated to about 800–900 ml. The precipitated product was collected by filtration and dried in vacuo for about twenty hours at 68–70° C. and for sixteen hours at 97° C. to give 23.68 g. of 8-carboxy-4b,8-dimethyl-12-isopropyl-1,2,3,4,4a,4b, 5,6,7,8,8a,9,10,10a-tetradecahydro - 3,10a - ethenophenanthro - [1,2 - c]-1'-[3-(1 - pyrrolidyl)propyl]-2',5'-pyrrolidinedione, M.P. 236.6–250.6° C. (corr.), $[\alpha]_D^{25}=-23.3°$ (1% in chloroform).

Analysis.—Calcd. for $C_{31}H_{46}N_2O_4$: C, 72.90; H, 9.08; N, 5.49. Found: C, 72.88; H, 9.21; N, 5.61.

EXAMPLE 6

8 - carboxy-4b,8-dimethyl-12-isopropyl-1,2,3,4,4a,4b,5, 6,7,8,8a,9,10,10a - tetradecahydro - 3,10a-ethenophenanthro[1,2 - c] - 1'-[2-(1-piperazinyl)ethyl]-2',5'-pyrrolidinedione [I; R is COOH, X is O, Y is $CH_2CH_2$, N=B is $N(CH_2)_4NH$] was prepared from 8.06 g. of 2-(1-piperazinyl)ethylamine and 24.03 g. of maleopimaric acid in 500 ml. of benzene according to the manipulative procedure described above in Example 1. The crude product was recrystallized by dissolving it in hot acetic acid, adding hot benzene and concentrating the solution. There was thus obtained 16.4 g. of 8-carboxy-4b,8-dimethyl-12-isopropyl - 1,2,3,4,4a,4b,5,6,7,8,8a,9,10,10a-tetradecahydro-3,10a - ethenophenanthro[1,2-c]-1'-[2-(1-piperazinyl) ethyl] - 2',5' - pyrrolidinedione, M.P. 264.2–266.4° C. (corr.), $[\alpha]_D^{25}=-26.7°$ (in 2 equivs. of 0.1 N HCl) after drying at 100–110° C. for sixty hours over phosphorus pentoxide.

Analysis.—Calcd. for $C_{30}H_{45}N_3O_4$: $N_{(total)}$, 8.21; $N_{(basic)}$, 5.47. Found: $N_{(total)}$, 8.03; $N_{(basic)}$, 5.25.

EXAMPLE 7

8 - carboxy-4b,8-dimethyl-12-isopropyl-1,2,3,4,4a,4b,5,6,7,8,8a,9,10,10a - tetradecahydro - 3,10a-ethenophenanthro[1,2 - c]-1'-[2-(4-phenyl-1-piperazinyl)ethyl]-2',5'-pyrrolidinedione [I; R is COOH, X is O, Y is $CH_2CH_2$, N=B is $N(CH_2)_4NC_6H_5$] was prepared from 6.62 g. of 2-(4-phenyl-1-piperazinyl)ethylamine and 12.02 g. of maleopimaric acid in 250 ml. of benzene according to the manipulative procedure described above in Example 1. The product was recrystallized from ethyl acetate and dried at 105–110° C. in vacuo for sixteen hours to give 12.88 g. of 8-carboxy-4b,8-dimethyl-12-isopropyl-1,2,3,4,4a,4b,5,6,7,8,8a,9,10,10a - tetradecahydro - 3,10a-ethenophenanthro[1,2 - c]-1'-[2-(4-phenyl-1-piperazinyl)ethyl]-2',5'-pyrrolidinedione, M.P. 255.0–257.8° C. (corr.), $[\alpha]_D^{25} = -32.0°$ (1% in pyridine).

Analysis.—Calcd for $C_{36}H_{49}N_3O_4$: $N_{(total)}$, 7.15; $N_{(basic)}$, 4.77. Found: $N_{(total)}$, 7.15; $N_{(basic)}$, 4.73.

EXAMPLE 8

8 - carbomethoxy - 4b,8-dimethyl-12-isopropyl-1,2,3,4,4a,4b,5,6,7,8,8a,9,10,10a - tetradecahydro - 3,10a-ethanophenanthro[1,2 - c] - 1'-(2-diethylaminoethyl)-2',5'-pyrrolidinedione [I; R is $COOCH_3$, X is O, Y is $CH_2CH_2$, N=B is $N(C_2H_5)_2$] can be prepared by replacing the maleopimaric acid in Example 1 by a molar equivalent amount of the methyl ester of maleopimaric acid. The same product is obtained by causing the compound of Example 1 to react with diazomethane.

EXAMPLE 9

8 - carboxy-4b,8-dimethyl-1,2,3,4,4a,4b,5,6,7,8,8a,9,10,10a - tetradecahydro - 3,10a-ethenophenanthro[1,2 - c] - 1'-(2-N-methylethylaminoethyl)-2',5'-pyrrolidinedione [I; R is COOH, X is O, Y is $CH_2CH_2$, N=B is $N(CH_3)C_2H_5$)] can be prepared by replacing the 2-diethylaminoethylamine in Example 1 by a molar equivalent amount of 2-N-methylethylaminoethylamine.

EXAMPLE 10

8 - carboxy-4b,8-dimethyl-12-isopropyl-1,2,3,4,4a,4b,5,6,7,8,8a,9,10,10a - tetradecahydro - 3,10a-ethenophenanthro[1,2 - c] - 1'-(2-di-n-butylaminoethyl)-2',5'-pyrrolidinedione [I; R is COOH, X is O, Y is $CH_2CH_2$, N=B is $N(C_4H_9)_2$] can be prepared by replacing the 2-diethylaminoethylamine in Example 1 by a molar equivalent amount of 2-di-n-butylaminoethylamine.

EXAMPLE 11

8 - carboxy - 4b,8-dimethyl-12-isopropyl-1,2,3,4,4a,4b,5,6,7,8,8a,9,10,10a - tetradecahydro - 3,10 - ethanophenanthro[1,2 - c] - 1'-(2-di-n-hexylaminoethyl)-2',5'-pyrrolidinedione [I; R is COOH, X is O, Y is $CH_2CH_2$, N=B is $N(C_6H_{13})_2$] can be prepared by replacing the 2-diethylaminoethylamine in Example 1 by a molar equivalent amount of 2-di-n-hexylaminoethylamine.

EXAMPLE 12

8 - carboxy-4b,8-dimethyl-12-isopropyl-1,2,3,4,4a,4b,5,6,7,8,8a,9,10,10a - tetradecahydro - 3,10a-ethenophenanthro[1,2 - c] - 1'-(2-dicyclohexylaminoethyl)-2',5'-pyrrolidinedione [I; R is COOH, X is O, Y is $CH_2CH_2$, N=B is $N(C_6H_{11})_2$] can be prepared by replacing the 2-diethylaminoethylamine in Example 1 by a molar equivalent amount of 2-dicyclohexylaminoethylamine.

EXAMPLE 13

8 - carboxy-4b,8-dimethyl-12-isopropyl-1,2,3,4,4a,4b,5,6,7,8,8a,9,10,10a - tetradecahydro - 3,10a-ethenophenanthro[1,2 - c] - 1'-[2-bis(4-methylcyclohexyl)aminoethyl]-2',5'-pyrrolidinedione [I; R is COOH, X is O, Y is $CH_2CH_2$, N=B is $N(C_6H_{10}CH_3—4)_2$] can be prepared by replacing the 2-diethylaminoethylamine in Example 1 by a molar equivalent amount of 2-bis(4-methylcyclohexyl)aminoethylamine.

EXAMPLE 14

8 - carboxy-4b,8-dimethyl-12-isopropyl-1,2,3,4,4a,4b,5,6,7,8,8a,9,10,10a - tetradecahydro - 3,10a-ethenophenanthro[1,2 - c] - 1'-(2-N-methylcyclohexylaminoethyl)-2',5'-pyrrolidinedione [I; R is COOH, X is O, Y is $CH_2CH_2$, N=B is $N(CH_3)(C_6H_{11})$] can be prepared by replacing the 2-diethylaminoethylamine in Example 1 by a molar equivalent amount of 2-N-methylcyclohexylaminoethylamine.

EXAMPLE 15

8,carboxy-4b,8 - dimethyl-12-isopropyl-1,2,3,4,4a,4b,5,6,7,8,8a,9,10,10a-tetradecahydro-3,10a - ethenophenanthro[1,2-c]-1'-[2-(1-piperidyl)ethyl]-2',5'-pyrrolidinedione [I; R is COOH, X is O, Y is $CH_2CH_2$, N=B is $N(CH_2)_5$] can be prepared by replacing the 2-diethylaminoethylamine in Example 1 by a molar equivalent amount of 2-(1-piperidyl)ethylamine.

EXAMPLE 16

8 - carboxy-4b,8-dimethyl-12-isopropyl-1,2,3,4,4a,4b,5,6,7,8,8a,9,10,10a-tetradecahydro - 3,10a-ethenophenanthro[1,2-c]-1'-[2-(2-methyl-1-pyrrolidyl)ethyl] - 2',5'-pyrrolidinedione [I; R is COOH, X is O, Y is $CH_2CH_2$, N=B is 2-methyl-1-pyrrolidyl] can be prepared by replacing the 2-diethylaminoethylamine in Example 1 by a molar equivalent amount of 2-(2-methyl-1-pyrrolidyl)ethylamine.

EXAMPLE 17

8-carboxy - 4b,8-dimethyl-12-isopropyl-1,2,3,4,4a,4b,5,6,7,8,8a,9,10,10a-tetradecahydro-3,10a - ethenophenanthro[1,2-c]-1'-[2-(4-methyl-1-piperazinyl)ethyl]-2',5' - pyrrolidinedione [I; R is COOH, X is O, L is $CH_2CH_2$, N=B is $N(CH_2)_4NCH_3$] can be prepared by replacing the 2-diethylaminoethylamine in Example 1 by a molar equivalent amount of 2-(4-methyl-1-piperazinyl)ethylamine.

EXAMPLE 18

8-carboxyl-4b,8-dimethyl-12-isopropyl - 1,2,3,4,4a,4b,5,6,7,8,8a,9,10,10a-tetradecahydro - 3,10a-ethenophenanthro[1,2-c]-1'-(2-dibenzylaminoethyl)-2',5' - pyrrolidinedione [I; R is COOH, X is O, Y is $CH_2CH_2$, N=B is $N(CH_2C_6H_5)_2$] can be prepared by replacing the 2-diethylaminoethylamine in Example 1 by a molar equivalent amount of 2-dibenzylaminoethylamine.

EXAMPLE 19

8-carboxy-4b,8-dimethyl - 1,2,3,4,4a,4b,5,6,7,8,8a,9,10,10a - tetradecahydro-3,10a-ethenophenanthro [1,2-c]-1'-[2-bis(2-phenylethyl)aminoethyl] - 2',5'-pyrrolidinedione [I; R is COOH, X is O, Y is $CH_2CH_2$, N=B is $N(CH_2CH_2C_6H_5)_2$] can be prepared by replacing the 2-diethylaminoethylamine in Example 1 by a molar equivalent amount of 2-bis(2-phenylethyl)aminoethylamine.

EXAMPLE 20

8-carboxy - 4b,8-dimethyl-12-isopropyl-1,2,3,4,4a,4b,5,6,7,8,8a,9,10,10a-tetradecahydro-3,10a - ethenophenanthro[1,2-c]-1' - (2-N-methylbenzylaminoethyl) - 2',5'pyrrolidinedione [I; R is COOH, X is O, Y is $CH_2CH_2$, N=B is $N(CH_3)(CH_2C_6H_5)$] can be prepared by replacing the 2-diethylaminoethylamine in Example 1 by a molar equivalent amount of 2-N-methylbenzylaminoethylamine.

EXAMPLE 21

8-carboxy-4b,8-dimethyl-12-isopropyl - 1,2,3,4,4a,4b,5,6,7,8,8a,9,10,10a - tetradecahydro-3,10a-ethenophenanthro [1,2-c]-1'-(2-dimethylamino-1-methylethyl) - 2',5'-pyrrolidinedione [I; R is COOH, X is O, Y is $CH(CH_3)CH_2$, N=B is $N(CH_3)_2$] can be prepared by replacing the 2- diethylaminoethylamine in Example 1 by a molar equivalent amount of 2-dimethylamino-1-methylethylamine.

EXAMPLE 22

8-carboxy-4b,8,dimethyl-12-isopropyl - 1,2,3,4,4a,4b,5, 6,7,8,8a,9,10,10a-tetradecahydro-3,10a - ethenophenanthro [1,2-c]-1'-(2-dimethylaminopyropyl) - 2',5' - pyrrolidinedione [I; R is COOH, X is O, Y is $CH_2CH(CH_3)$, N=B is $N(CH_3)_2$] can be prepared by replacing the 2-diethylaminoethylamine in Example 1 by a molar equivalent amount of 2-dimethylaminopropylamine.

EXAMPLE 23

8-carboxy-4b,8-dimethyl-12-isopropyl - 1,2,3,4,4a,4b,5, 6,7,8,8a,9,10,10a - tetradecahydro-3,10a-ethenophenanthro [1,2-c]-1'-(4-dimethylaminobutyl) - 2',5'-pyrrolidinedione [I; R is COOH, X is O, Y is $CH_2CH_2CH_2CH_2$, N=B is $N(CH_3)_2$] can be prepared by replacing the 2-diethylaminoethylamine in Example 1 by a molar equivalent amount of 4-dimethylaminobutylamine.

EXAMPLE 24

8-carboxy-4b,8-dimethyl-12-isopropyl - 1,2,3,4,4a,4b,5, 6,7,8,8a,9,10,10a - tetradecahydro-3,10a-ethenophenanthro [1,2-c]-1'-(5-dimethylaminopentyl) - 2',5' - pyrrolidinedione [I; R is COOH, X is O, Y is $CH_2CH_2CH_2CH_2CH_2$, N=B is $N(CH_3)_2$] can be prepared by replacing the 2-diethylaminoethylamine in Example 1 by a molar equivalent amount of 5-dimethylaminopentylamine.

EXAMPLE 25

8-carboxy-4b,8-dimethyl-12-isopropyl - 1,2,3,4,4a,4b,5, 6,7,8,8a,9,10,10a-tetradecahydro - 3,10a-ethenophenanthro [1,2-c]-1'-(2-dimethylamino-1,2 - dimethylethyl)-2',5'-pyrrolidinedione [I; R is COOH, X is O, Y is $CH(CH_3)CH(CH_3)$, N=B is $N(CH_3)_2$] can be prepared by replacing the 2-diethylaminoethylamine in Example 1 by a molar equivalent amount of 2-dimethylamino-1,2-dimethylethylamine.

EXAMPLE 26

*4b,8-Dimethyl-8-Hydroxymethyl-12-Isopropyl - 1,2,3,4,4a 4b,5,6,7,8,8a,9,10,10a - Tetradecahydro-3,10a - Ethenophenanthro[1,2-c] - 1'-(2 - Diethylaminoethyl)Pyrrolidine*

[I; R is $CH_2OH$, X is $H_2$, Y is $CH_2CH_2$, N=B is $N(C_2H_5)_2$]

8-carboxy-4b,8-dimethyl-12-isopropyl - 1,2,3,4,4a,4b,5, 6,7,8,8a,9,10,10a - tetradecahydro-3,10a-ethenophenanhro [1,2-c]-1'-(2-diethylaminoethyl) - 2',5' - pyrrolidinedione (Example 1) (20.92 g., 0.042 mole) was placed in the thimble of a Soxhlet extraction apparatus and leached into a suspension of 8.0 g. (0.21 mole) of lithium aluminum hydride in 800 ml. of anhydrous ether. After sixteen hours the starting material had been completely dissolved, and the excess lithium aluminum hydride was decomposed by the addition of saturated Rochelle salt solution in a nitrogen atmosphere. The mixture was filtered and the solid material washed with water, methanol and ether. The filtrate and washings were separated into organic and aqueous layers, and the organic layer was washed with water, dried and concentrated in vacuo. The residue was recrystallized from ether to give 14.41 g. of 4b, 8-dimethyl-8-hydroxymethyl-12-isopropyl - 1,2,3,4,4a,4b,5, 6,7,8,8a,9,10,10a - tetradecahydro-3,10a-ethenophenanthro [1,2-c]-1'-(2-diethylaminoethyl)pyrrolidine, M.P. 116–122° C. (uncorr.). A sample (4.00 g.) of the free base was dissolved in 95 ml. of ether and 5 ml. of methanol, and the solution was cooled to 0° C. There was then added 7.26 ml. of 2.66 molar ethereal hydrogen chloride. After standing for two hours in an ice bath there separated 4.64 g. of the dihydrochloride salt, M.P. indefinite starting at 243.0° C' (corr..), $[\alpha]_D^{25}=+1.84°\pm0.2°$ (1% in ethanol) when recrystallized twice from a methanolether mixture.

*Analysis.*—Calcd. for $C_{30}H_{52}N_2O\cdot2HCl$: C, 68.02; H, 10.26; Cl, 13.39. Found: C, 68.05; H,10.22; Cl, 13.40.

The same product is obtained by lithium aluminum hydride reduction of 8-carbomethoxy-4b-8-dimethyl-12-isopropyl-1,2,3,4,4a,4b,5,6,7,8,8a,9,10,10a - tetradecahydro-3,10a-ethenophenanthro[1,2-c]-1'-(2 - diethylaminoethyl) 2',5'-pyrrolidinedione (Example 8).

4b,8-dimethyl-8-hydroxymethyl-12 - isopropyl - 1,2,3,4, 4a,4b,5,6,7,8,8a,9,10,10a - tetradecahydro - 3,10a - ethenophenanthro-[1,2-c]-1'-(2-diethylaminoethyl)pyrrolidine is obtained in the form of its hydrofluoride, hydrobromide, hydroiodide, sulfate (or bisulfate), phosphate (or acid phosphate), acetate, tartrate (or bitartrate), lactate, citrate (or acid citrate), benzenesulfonate, ethanesulfonate, methiodide, allobromide or benzochloride salt, when contacted, respectively, with hydrofluoric acid, hydrobromic acid, hydriodic acid, sulfuric acid, phosphoric acid, acetic acid, tartaric acid, lactic acid, citric acid, benzenesulfonic acid, ethanesulfonic acid, methyl iodide, allyl bromide or benzyl chloride.

4b,8-dimethyl - 8 - hydroxymethyl - 12 - isopropyl-1,2,3, 4,4a,4b,5,6,7,8,8a,9,10,10a - tetradecahydro-3,10a-ethenophenanthro[1,2-c]-1'-(2-diethylaminoethyl)pyrrolidine in the form of its hydrofluoride salt can be converted to the hydrochloride salt by passing an aqueous solution of the former over an ion-exchange resin saturated with chloride ion.

A solution of 6.17 g. of 4b,8-dimethyl-8-hydroxymethyl-12-isopropyl - 1,2,3,4,4a,4b,5,6,7,8,8a,9,10,10a - tetradecahydro-3,10a-ethenophenanthro[1,2-c]-1'-(2 - diethylaminoethyl)pyrrolidine and an excess of methyl iodide in methanol solution was refluxed for three hours. The crystalline product which separated upon cooling was collected and recrystallized from acetone to give 4.80 g. of the monomethiodide salt, M.P. 192–200° C. (uncorr.). A sample when purified by several recrystallizations from acetone had the M.P. 201.8–203.6° C. (corr.), $[\alpha]_D^{25}=-5.6°$ (1% in ethanol).

*Analysis.*—Calcd. for $C_{31}H_{55}IN_2O$: C, 62.19; H, 9.26; I, 21.20. Found: C, 62.51; H, 9.00; I, 21.01.

The mother liquors from the recrystallizations of the above monomethiodide were taken to dryness, the residue dissolved in 50 ml. of ethanol, 5 ml. of methyl iodide added, and the mixture refluxed for eighteen hours. The reaction mixture was evaporated to dryness, the residue recrystallized several times from acetone, and the product dried at 90° C. for eight hours in vacuo to give the dimethiodide salt of 4b,8-dimethyl-8-hydroxymethyl-12-isopropyl-1,2,3,4,4a,4b,5,6,7,8,8a,9,10,10a - tetradecahydro-3, 10a - ethenophenanthro[1,2-c] - 1' - (2-diethylaminoethyl)pyrrolidine, M.P. 222–236° C. (uncorr.).

*Analysis.*—Calcd. for $C_{32}H_{58}ON_2I_2$: I, 34.27. Found: I, 34.42.

4b,8-dimethyl - 8 - hydroxymethyl - 12 - isopropyl-1,2, 3,4,4a,4b,5,6,7,8,8a,9,10,10a - tetradecahydro - 3,10a-ethenophenanthro[1,2-c] - 1' - (2 - diethylaminoethyl)pyrrolidine can be caused to react with acetic anhydride, propionic anhydride, caproyl chloride, succinic anhydride, β-cyclopentylpropionyl chloride, benzoyl chloride, p-nitrobenzoyl chloride, 3,4,5-trimethoxybenzoyl chloride, phenylacetyl chloride, cinnamoyl chloride, or p-chlorophenoxyacetyl chloride, by heating in the presence of pyridine, to give, respectively, 8-acetoxymethyl-, 8-propionoxymethyl-, 8-caproyloxymethyl-, 8 - (β-carboxypropionoxy)methyl-, 8-(β-cyclopentylpropionoxy)methyl-, 8-benzoyloxymethyl-, 8-(p-nitrobenzoyloxy)methyl-, 8-(3,4,5-trimethoxybenzoyloxy)methyl-, 8-phenylacetoxymethyl-, 8-cinnamoyloxymethyl-, or 8-(p-chlorophenoxyacetoxy)methyl-4b,8-dimethyl-12-isopropyl - 1,2,3,4,4a,4b,5,6,7,8,8a,9,10,10a-tetradecahydro - 3,10a - ethenophenanthro[1,2-c]-1'-(2-diethylaminoethyl)pyrrolidine.

EXAMPLE 27

*4b,8-Dimethyl-8-Hydroxymethyl - 12 - Isopropyl-1,2,3,4, 4a,4b,5,6,7,8,8a,9,10,10a-Tetradecahydro - 3,10a - Ethenophenanthro[1,2 - c]-1'-[2 - (4 - Morpholinyl)Ethyl] Pyrrolidine*

[I; R is $CH_2OH$, X is $H_2$, Y is $CH_2CH_2$, N=B is $N(CH_2)_4O$]

A mixture of 7.77 g. of 8-carboxy-4b,8-dimethyl-12-isopropyl - 1,2,3,4,4a,4b,5,6,7,8,8a,9,10,10a - tetradecahydro - 3,10a - ethenophenanthro[1,2-c] - 1' - [2-(4-morpholinyl)ethyl]-2'-5'-pyrrolidinedione (Example 2) and 2.88 g. of lithium aluminum hydride in 600 ml. of tetrahydrofuran was refluxed for twenty-six hours. The excess lithium aluminum hydride was hydrolyzed, and the solid product was collected and converted to the dihydrochloride salt with excess ethereal hydrogen chloride. The dihydrochloride salt was recrystallized from a methanol-ether mixture [M.P. 206–232° C. (uncorr.)] and then converted to the free base by treating it with 5% aqueous potassium hydroxide solution. The free base was extracted with ether, and the ether extracts were washed with water and saturated sodium chloride solution and concentrated. The residue was recrystallized from ethyl acetate and dried at 50° C. for four hours in vacuo over phosphorus pentoxide to give 3.27 g. of 4b,8-dimethyl-8-hydroxymethyl-12-isopropyl - 1,2,3,4,4a,4b,5,6,7,8,8a,9,10,10a - tetradecahydro-3,10a-ethenophenanthro[1,2-c] - 1' - [2-(4-morpholinyl)ethyl]pyrrolidine, M.P. 89.4–94.0° C. (corr.), $[\alpha]_D^{25}$ = −13.8° (1% in chloroform).

*Analysis.*—Calcd. for $C_{30}H_{50}N_2O_2$: C, 76.54; H, 10.71; O, 6.80. Found: C, 76.74; H, 10.90; O, 6.83.

4b,8 - dimethyl - 8 - hydroxymethyl - 12 - isopropyl-1,2,3,4,4a,4b,5,6,7,8,8a,9,10,10a - tetradecahydro - 3,10a-ethenophenanthro[1,2 - c] - 1' - [2-(4-morpholinyl)ethyl]pyrrolidine in the form of its dihydrochloride salt was found to have a minimum effective hypotensive dose of about 0.10 mg./kg. of body weight when injected subcutaneously into renal hypertensive rats and measured by the photoelectric foot method of Kersten et al., loc. cit.

EXAMPLE 28

4b,8 - dimethyl - 8 - hydroxymethyl - 12 - isopropyl-1,2,3,4,4a,4b,5,6,7,8,8a,9,10,10a - tetradecahydro - 3,10a-ethenophenanthro[1,2-c] - 1' - (3 - hexamethyleniminopropyl)pyrrolidine [I; R is $CH_2OH$, X is $H_2$, Y is $$CH_2CH_2CH_2$$

N=B is $N(CH_2)_6$] was prepared from 26.94 g. of 8-carboxy - 4b,8 - dimethyl - 12 - isopropyl - 1,2,3,4,4a,4b,5,6,7,8,8a,9,10,10a - tetradecahydro - 3,10a - ethenophenanthro[1,2-c] - 1' - (3 - hexamethyleniminopropyl) - 2',5' - pyrrolidinedione (Example 3) and 9.49 g. of lithium aluminum hydride in 1500 ml. of ether according to the manipulative procedure described above in Example 26. The crude product was treated with excess ethereal hydrogen chloride to give 22.0 g. of 4b,8-dimethyl-8-hydroxymethyl-12 - isopropyl - 1,2,3,4,4a,4b,5,6,7,8,8a,9,10,10a - tetradecahydro - 3,10a - ethenophenanthro[1,2-c]-1'-(3 - hexamethyleniminopropyl)pyrrolidine in the form of its dihydrochloride salt, M.P. 252.4–267.4° C. (dec.) (corr.), $[\alpha]_D^{25}$ = +1.75°±0.1° (1% in ethanol) when recrystallized from a methanol-ether mixture and dried for six hours in vacuo at 80° C. over phosphorus pentoxide.

*Analysis.*—Calcd. for $C_{33}H_{56}N_2O \cdot 2HCl$: C, 69.57; H, 10.26; Cl, 12.46. Found: C, 69.44; H, 10.56; Cl, 12.72.

4b,8 - dimethyl - 8 - hydroxymethyl - 12 - isopropyl-1,2,3,4,4a,4b,5,6,7,8,8a,9,10,10a - tetradecahydro - 3,10a-ethenophenanthro[1,2-c] - 1' - (3 - hexamethyleniminopropyl)pyrrolidine in the form of its dihydrochloride salt was found to have a minimum effective hypotensive dose of about 0.10 mg./kg. of body weight when injected subcutaneously into renal hypertensive rats and measured by the photoelectric foot method of Kersten et al., loc. cit. The intravenous toxicity ($ALD_{50}$) in the mouse was found to be 22 mg./kg.

EXAMPLE 29

4b,8 - dimethyl - 8 - hydroxymethyl - 12 - isopropyl-1,2,3,4,4a,4b,5,6,7,8,8a,9,10,10a - tetradecahydro - 3,10a-ethenophenanthro[1,2 - c] - 1' - (3 - dimethylaminopropyl)pyrrolidine [I; R is $CH_2OH$, X is $H_2$, Y is $CH_2CH_2CH_2$, N=B is $N(CH_3)_2$] was prepared from 12.12 g. of 8 - carboxy - 4b,8 - dimethyl - 12 - isopropyl-1,2,3,4,4a,4b,5,6,7,8,8a,9,10,10a - tetradecahydro - 3,10a-ethenophenanthro[1,2 - c] - 1' - (3 - dimethylaminopropyl)-2',5'-pyrrolidinedione (Example 4) and 4.74 g. of lithium aluminum hydride in 600 ml. of tetrahydrofuran according to the manipulative procedure described above in Example 27. The total product was dissolved in 300 ml. of methanol, and 35–40 ml. of methanol containing 5.8 g. of 85% phosphoric acid was added. The solution was concentrated to a volume of 200 ml., 200 ml. of isopropyl alcohol was added, and the solution was further concentrated until crystallization began. The product was collected, recrystallized from a methanol-isopropyl alcohol mixture and dried for sixteen hours at 100° C. in vacuo over phosphorus pentoxide to give 12.33 g. of 4b,8 - dimethyl - 8 - hydroxymethyl - 12 - isopropyl-1,2,3,4,4a,4b,5,6,7,8,8a,9,10,10a - tetradecahydro - 3,10a-ethenophenanthro[1,2 - c] - 1' - (3 - dimethylaminopropyl)pyrrolidine in the form of its diphosphate salt, M.P. 216.6–221.4° C. (corr.), $[\alpha]_D^{25}$ = +1.0° (1% in methanol).

*Analysis.*—Calcd. for $C_{29}H_{50}N_2O \cdot 2H_3PO_4$: C, 54.53; H, 8.84; N, 4.39. Found: C, 54.29; H, 9.04; N, 4.29.

4b,8 - dimethyl - 8 - hydroxymethyl - 12 - isopropyl-1,2,3,4,4a,4b,5,6,7,8,8a,9,10,10a - tetradecahydro - 3,10a-ethenophenanthro[1,2 - c] - 1' - (3 - dimethylaminopropyl)pyrrolidine in the form of its diphosphate salt was found to have a minimum effective hyptotensive dose of about 0.10 mg./kg. of body weight when injected subcutaneously into renal hypertensive rats and measured by the photoelectric foot method of Kersten et al., loc. cit. The intravenous toxicity ($LD_{50}$) in the mouse was found to be 34±2.0 mg./kg.

4b,8-dimethyl-8-hydroxymethyl - 12 - isopropyl-1,2,3,4, 4a,4b,5,6,7,8,8a,9,10,10a-tetradecahydro - 3,10a - ethenophenanthro[1,2-c] - 1' - (3-dimethylaminopropyl)pyrrolidine in the form of its diphosphate salt was found to have a coronary dilator activity 2–4 times that of papaverine when measured on the isolated rabbit heart by the method of Luduena et al., J. Am. Pharm. Assoc., Sci. Ed. 44, 363–6 (1955).

EXAMPLE 30

4b,8-dimethyl-8-hydroxymethyl - 12 - isopropyl-1,2,3,4, 4a,4b,5,6,7,8,8a,9,10,10a-tetradecahydro - 3,10a - ethenophenanthro[1,2-c] - 1' - [3-(1-pyrrolidyl)propyl]pyrrolidine [I; R is $CH_2OH$, X is $H_2$, Y is $CH_2CH_2CH_2$, N=B is $N(CH_2)_4$] was prepared from 15.32 g. of 8-carboxy-4b,8-dimethyl - 12 - isopropyl - 1,2,3,4,4a,4b,5,6,7,8,8a,9,10,10a-tetradecahydro - 3,10a - ethenophenanthro[1,2-c]-1'-[3-(1-pyrrolidyl)propyl]-2',5'pyrrolidinedione (Example 5) and 5.69 g. of lithium aluminum hydride in 370 ml. of tetrahydrofuran according to the manipulative procedure described above in Example 27. The product was recrystallized from aqueous methanol to give 11.90 g. of 4b,8-dimethyl-8-hydroxymethyl-12-isopropyl-1,2,3,4, 4a,4b,5,6,7,8,8a,9,10,10a-tetradecahydro - 3,10a - ethenophenanthro[1,2-c] - 1' - [3-(1-pyrrolidyl)propyl]pyrrolidine, M.P. 73.4–78.6° C. (corr.), $[\alpha]_D^{25}$ = −14.6° (1% in chloroform).

*Analysis.*—Calcd. for $C_{31}H_{52}N_2O$: C, 79.43; H, 11.18; N, 5.98. Found: C, 79.51; H, 10.98; N, 6.03.

4b,8-dimethyl-8-hydroxymethyl - 12 - isopropyl-1,2,3,4, 4a,4b,5,6,7,8,8a,9,10,10a-tetradecahydro - 3,10a - ethenophenanthro[1,2-c] - 1' - [3-(1-pyrrolidyl)propyl]pyrrolidine was found to have a coronary dilator activity 1.9–2.4 times that of papaverine when measured on the isolated rabbit heart by the method of Luduena et al. loc. cit.

EXAMPLE 31

4b,8-dimethyl-8-hydroxymethyl - 12 - isopropyl-1,2,3,4, 4a,4b,5,6,7,8,8a,9,10,10a-tetradecahydro - 3,10a - ethenophenanthro[1,2-c] - 1' - [2-(1-piperazinyl)ethyl]pyrrolidine [I; R is $CH_2OH$, X is $H_2$, Y is $CH_2CH_2$, N=B is $N(CH_2)_4NH$] can be prepared by reducing 8-carboxy-4b,8-dimethyl - 12 - isopropyl-1,2,3,4,4a,4b,5,6,7,8,8a,9, 10,10a-tetradecahydro-3,10a-ethenophenanthro [1,2-c]-1'-[2-(1-piperazinyl)ethyl]-2',5'-pyrrolidinedione (Example 6) with lithium aluminum hydride according to the manipulative procedure described above in Example 26 or 27.

EXAMPLE 32

4b,8-dimethyl-8-hydroxymethyl - 12 - isopropyl-1,2,3,4, 4a,4b,5,6,7,8,8a,9,10,10a-tetradecahydro - 3,10a - ethenophenanthro[1,2-c] - 1' - [2-(4-phenyl - 1 - piperazinyl) ethyl]pyrrolidine [I; R is $CH_2OH$, X is $H_2$, Y is $CH_2CH_2$, N=B is $N(CH_2)_4NC_6H_5$] was prepared from 11.19 g. of 8-carboxy-4b,8-dimethyl - 12 - isopropyl-1,2,3,4,4a,4b,5,6, 7,8,8a,9,10,10a - tetradecahydro - 3,10a - ethenophenanthro[1,2-c] - 1' - [2-(4-phenyl-1-piperazinyl)ethyl]-2'5'-pyrrolidinedione (Example 7) and 3.61 g. of lithium aluminum hydride in 325 ml. of tetrahydrofuran according to the manipulative procedure described above in Example 27. The product was recrystallized from an ethyl acetate-petroleum ether (Skellysolve C) mixture and dried at 80–82° C. for twenty hours in vacuo to give 8.67 g. of 4b,8-dimethyl-8-hydroxymethyl-12-isoproyl-1,2,3,4,4a,4b,5,6,7,8,8a,9,10,10a - tetradecahydro - 3,10a-ethenophenanthro[1,2-c] - 1' - [2-(4 - phenyl - 1 - piperazinyl)ethyl]-pyrrolidine, M.P. 124.8–128° C. (corr.), $[\alpha]_D^{25}=-12.3°$ (1% in chloroform).

*Analysis.*—Calcd. for $C_{36}H_{55}N_3O$: $N_{(total)}$, 7.70; $N_{(basic)}$, 5.14. Found: $N_{(total)}$, 7.65; $N_{(basic)}$, 4.87.

EXAMPLE 33

4b,8-dimethyl-8-hydroxymethyl - 12 - isopropyl-1,2,3,4, 4a,4b,5,6,7,8,8a,9,10,10a-tetradecahydro - 3,10a - ethenophenanthro[1,2-c] - 1' - (2 - N - methylethylaminoethyl) pyrrolidine [I; R is $CH_2OH$, X is $H_2$, Y is $CH_2CH_2$, N=B is $N(CH_3)(C_2H_5)$] can be prepared by lithium aluminum hydride reduction of 8-carboxy-4b,8-dimethyl-12-isopropyl - 1,2,3,4,4a,4b,5,6,7,8,8a,9,10,10a-tetradecahydro - 3, 10a-ethenophenanthro[1,2-c] - 1' - (2 - N - methylethylaminoethyl)-2'-5'-pyrrolidinedione (Example 9) according to the manipulative procedures described above in Examples 26 and 27.

EXAMPLE 34

4b,8-dimethyl-8-hydroxymethyl - 12 - isopropyl-1,2,3,4, 4a,4b,5,6,7,8,8a,9,10,10a-tetradecahydro - 3,10a - ethenophenanthro[1,2-c] - 1' - (2-di-n-butylaminoethyl)pyrrolidine [I; R is $CH_2OH$, X is $H_2$, Y is $CH_2CH_2$, N=B is $N(C_4H_9)_2$] can be prepared by lithium aluminum hydride reduction of 8-carboxy-4b,8-dimethyl-12-isopropyl-1,2,3, 4,4a,4b,5,6,7,8,8a,9,10,10a - tetradecahydro-3,10a-ethenophenanthro[1,2-c] - 1' - (2-di-n-butylaminoethyl) - 2',5'- pyrrolidinedione (Example 10) according to the manipulative procedures described above in Examples 26 and 27.

EXAMPLE 35

4b,8 - dimethyl - 8 - hydroxymethyl - 12 - isopropyl-1,2,3,4,4a,4b,5,6,7,8,8a,9,10,10a - tetradecahydro - 3,10a-ethenophenanthro[1,2 - c] - 1' - (2 - di - n - hexylaminoethyl)pyrrolidine [I; R is $CH_2OH$, X is $H_2$, Y is $CH_2CH_2$, N=B is $N(CH_6H_{13})_2$] can be prepared by lithium aluminum hydride reduction of 8-carboxy-4b,8-dimethyl-12-isopropyl - 1,2,3,4,4a,4b,5,6,7,8,8a,9,10,10a - tetradecahydro - 3,10a - ethenophenanthro[1,2 - c] - 1' - (2 - di - n - hexylaminoethyl)-2',5'-pyrrolidinedione (Example 11) according to the manipulative procedures described above in Examples 26 and 27.

EXAMPLE 36

4b,8 - dimethyl - 8 - hydroxymethyl - 12 - isopropyl-1,2,3,4,4a,4b,5,6,7,8,8a,9,10,10a - tetradecahydro - 3,10a-ethenophenanthro[1,2 - c] - 1' - (2 - dicyclohexylaminoethyl)pyrrolidine [I; R is $CH_2OH$, X is $H_2$, Y is $CH_2CH_2$, N=B is $N(C_6H_{11})_2$] can be prepared by lithium aluminum hydride reduction of 8-carboxy-4b,8-dimethyl-12-isopropyl - 1,2,3,4,4a,4b,5,6,7,8,8a,9,10,10a- tetradecahydro-3,10a - ethenophenanthro[1,2 - c] - 1' - (2 - dicyclohexylaminoethyl)-2',5'-pyrrolidinedione (Example 12) according to the manipulative procedures described above in Examples 26 and 27.

EXAMPLE 37

4b,8 - dimethyl - 8 - hydroxymethyl - 12 - isopropyl - 1,2,3,4,4a,4b,5,6,7,8,8a,9,10,10a - tetradecahydro - 3,10a-ethenophenanthro[1,2 - c] - 1' - [2 - bis(4 - methylcyclohexyl)aminoethyl]pyrrolidine [I; R is $CH_2OH$, X is $H_2$, Y is $CH_2CH_2$, N=B is $N(C_6H_{10}CH_3-4)_2$] can be prepared by lithium aluminum hydride reduction of 8-carboxy-4b,8-dimethyl - 12 - isopropyl - 1,2,3,4,4a,4b,5,6,7,8,8a,9,10, 10a - tetradecahydro - 3,10a - ethenophenanthro[1,2 - c]-1' - [2 - bis(4 - methylcyclohexyl)aminoethyl] - 2',5'-pyrrolidinedione (Example 13) according to the manipulative procedures described above in Examples 26 and 27.

EXAMPLE 38

4b,8 - dimethyl - 8 - hydroxymethyl - 12 - isopropyl-1,2,3,4,4a,4b,5,6,7,8,8a,9,10,10a - tetradecahydro - 3,10a-ethenophenanthro[1,2 - c] - 1' - (2 - N - methylcyclohexylaminoethyl)pyrrolidine [I; R is $CH_2OH$, X is $H_2$, Y is $CH_2CH_2$, N=B is $N(CH_3)(C_6H_{11})$] can be prepared by lithium aluminum hydride reduction of 8-carboxy-4b,8-dimethyl-12-isopropyl - 1,2,3,4,4a,4b,5,6,7,8,8a,9,10,10a-tetradecahydro - 3,10a - ethenophenanthro[1,2 - c] - 1' - (2 - N - methylcyclohexylaminoethyl) - 2',5' - pyrrolidinedione (Example 14) according to the manipulative procedures described above in Examples 26 and 27.

EXAMPLE 39

4b,8 - dimethyl - 8 - hydroxymethyl - 12 - isopropyl-1,2,3,4,4a,4b,5,6,7,8,8a,9,10,10a - tetradecahydro - 3,10a-ethenophenanthro[1,2 - c] - 1' - [2 - (1 - piperidyl)ethyl]-pyrrolidine [I; R is $CH_2OH$, X is $H_2$, Y is $CH_2CH_2$, N=B is $N(CH_2)_5$] can be prepared by lithium aluminum hydride reduction of 8-carboxy-4b,8-dimethyl-12-isopropyl-1,2,3,4,4a,4b,5,6,7,8,8a,9,10,10a - tetradecahydro - 3,10a-ethenophenanthro[1,2 - c] - 1' - [2 - (1 - piperidyl)ethyl]-2',5'-pyrrolidinedione (Example 15) according to the manipulative procedures described above in Examples 26 and 27.

EXAMPLE 40

4b,8 - dimethyl - 8 - hydroxymethyl - 12 - isopropyl-1,2,3,4,4a,4b,5,6,7,8,8a,9,10,10a - tetradecahydro - 3,10a-ethenophenanthro[1,2 - c] - 1' - [2 - (2 - methyl - 1 - pyrrolidyl)ethyl]pyrrolidine [I; R is $CH_2OH$, X is $H_2$, Y is $CH_2CH_2$, N=B is 2-methyl-1-pyrrolidyl] can be prepared by lithium aluminum hydride reduction of 8-carboxy-4b,8 - dimethyl - 12 - isopropyl - 1,2,3,4,4a,4b,5,6,7,8, 8a,9,10,10a - tetradecahydro - 3,10a - ethenophenanthro-[1,2 - c] - 1' - [2 - (2 - methyl - 1 - pyrrolidyl)ethyl]-2',5'-pyrrolidinedione (Example 16) according to the manipulative procedures described above in Examples 26 and 27.

4b,8 - dimethyl - 8 - hydroxymethyl - 12 - isopropyl-1,2,3,4,4a,4b,5,6,7,8,8a,9,10,10a - tetradecahydro - 3,10a-ethenophenanthro[1,2 - c] - 1' - [2 - (4 - methyl - 1-piperazinyl)ethyl]pyrrolidine [I; R is $CH_2OH$, X is $H_2$, Y is $CH_2CH_2$, N=B is $N(CH_2)_4NCH_3$] can be prepared by lithium aluminum hydride reduction of 8-carboxy-4b,8-dimethyl - 12 - isopropyl - 1,2,3,4,4a,4b,5,6,7,8,8a,9,10, 10a - tetradecahydro - 3,10a - ethenophenanthro[1,2 - c]-1' - [2 - (4 - methyl - 1 - piperazinyl)ethyl] - 2',5' - pyrrolidinedione (Example 17) according to the manipulative procedures described above in Examples 26 and 27.

EXAMPLE 42

4b,8 - dimethyl - 8 - hydroxymethyl - 12 - isopropyl-1,2,3,4,4a,4b,5,6,7,8,8a,9,10,10a - tetradecahydro - 3,10a-ethenophenanthro[1,2 - c] - 1' - (2 - dibenzylaminoethyl)-pyrrolidine [I; R is $CH_2OH$, X is $H_2$, Y is $CH_2CH_2$, N=B is $N(CH_2C_6H_5)_2$] can be prepared by lithium aluminum hydride reduction of 8-carboxy-4b,8-dimethyl-12-isopropyl - 1,2,3,4,4a,4b,5,6,7,8,8a,9,10,10a - tetradecahydro-3,10a - ethenophenanthro[1,2 - c] - 1' - (2 - dibenzylaminoethyl)-2',5'-pyrrolidinedione (Example 18) according to the manipulative procedures described above in Examples 26 and 27.

EXAMPLE 43

4b,8 - dimethyl - 8 - hydroxymethyl - 12 - isopropyl-1,2,3,4,4a,4b,5,6,7,8,8a,9,10,10a - tetradecahydro - 3,10a-ethenophenanthro[1,2 - c] - 1' - [2 - (2 - phenylethyl)-aminoethyl]pyrrolidine [I; R is $CH_2OH$, X is $H_2$, Y is $CH_2CH_2$, N=B is $N(CH_2CH_2C_6H_5)_2$] can be prepared by lithium aluminum hydride reduction of 8-carboxy-4b,8 - dimethyl - 12 - isopropyl - 1,2,3,4,4a,4b,5,6,7,8,8a,9,10,10a - tetradecahydro - 3,10a - ethenophenanthro-[1,2 - c] - 1' - [2 - bis(2 - phenylethyl)aminoethyl]-2',5'-pyrrolidinedione (Example 19) according to the manipulative procedures described above in Examples 26 and 27.

EXAMPLE 44

4b,8 - dimethyl - 8 - hydroxymethyl - 12 - isopropyl-1,2,3,4,4a,4b,5,6,7,8,8a,9,10,10a - tetradecahydro - 3,10a-ethenophenanthro[1,2 - c] - 1' - (2 - N - methylbenzylaminoethyl)pyrrolidine [I; R is $CH_2OH$, X is $H_2$, Y is $CH_2CH_2$, N=B is $N(CH_3)(CH_2C_6H_5)$] can be prepared by lithium aluminum hydride reduction of 8-carboxy-4b,8 - dimethyl - 12 - isopropyl - 1,2,3,4,4a,4b,5,6,7,8,8a,9,10,10a - tetradecahydro - 3,10a - ethenophenanthro-[1,2 - c] - 1' - (2 - N - methylbenzylaminoethyl) - 2',5'-pyrrolidinedione (Example 20) according to the manipulative procedures described above in Examples 26 and 27.

EXAMPLE 45

4b,8 - dimethyl - 8 - hydroxymethyl - 12 - isopropyl-1,2,3,4,4a,4b,5,6,7,8,8a,9,10,10a - tetradecahydro - 3,10a-ethenophenanthro[1,2 - c] - 1' - (2 - dimethylamino - 1-methylethyl)pyrrolidine [I; R is $CH_2OH$, X is $H_2$, Y is $CH(CH_3)CH_2$, N=B is $N(CH_3)_2$] can be prepared by lithium aluminum hydride reduction of 8-carboxy-4b,8-dimethyl - 12 - isopropyl - 1,2,3,4,4a,4b,5,6,7,8,8a,9,10,10a - tetradecahydro - 3,10a - ethenophenanthro[1,2 - c]-1' - (2 - dimethylamino - 1 - methylethyl) 2',5' - pyrrolidinedione (Example 21) according to the manipulative procedures described above in Examples 26 and 27.

EXAMPLE 46

4b,8 - dimethyl - 8 - hydroxymethyl - 12 - isopropyl-1,2,3,4,4a,4b,5,6,7,8,8a,9,10,10a - tetradecahydro - 3,10a-ethenophenanthro[1,2 - c] - 1' - (2 - dimethylaminopropyl)pyrrolidine [I; R is $CH_2OH$, X is $H_2$, Y is $CH_2CH(CH_3)$ N=B is $N(CH_3)_2$] can be prepared by lithium aluminum hydride reduction of 8-carboxy-4b,8-dimethyl-12-isopropyl - 1,2,3,4,4a,4b,5,6,7,8,8a,9,10,10a - tetradecahydro-3,10a - ethenophenanthro[1,2 - c] - 1' - (2 - dimethylaminopropyl)-2',5'-pyrrolidinedione (Example 22) according to the manipulative procedures described above in Examples 26 and 27.

EXAMPLE 47

4b,8- dimethyl - 8 - hydroxymethyl-12-isopropyl-1,2,3,4,4a,4b,5,6,7,8,8a,9,10,10a - tetradecahydro - 3,10a-ethenophenanthro[1,2-c] - 1'-(4-dimethylaminobutyl)pyrrolidine [I; R is $CH_2OH$, X is $H_2$, Y is $CH_2CH_2CH_2CH_2$, N=B is $N(CH_3)_2$] can be prepared by lithium aluminum hydride reduction of 8-carboxy-4b,8-dimethyl-12-isopropyl - 1,2,3,4,4a,4b,5,6,7,8,8a,9,10,10a-tetradecahydro- 3,10a-ethenophenanthro[1,2-c]-1'-(4-dimethylaminobutyl)-2',5'-pyrrolidenedione (Example 23) according to the manipulative procedures described above in Examples 26 and 27.

EXAMPLE 48

4b,8 - dimethyl - 8 - hydroxymethyl-12-isopropyl-1,2,3,4,4a,4b,5,6,7,8,8a,9,10,10a - tetradecahydro-3,10a-ethenophenanthro[1,2-c] - 1'-(5 - dimethylaminopentyl)pyrrolidine [I; R is $CH_2OH$, X is $H_2$, Y is $CH_2CH_2CH_2CH_2CH_2$, N=B is $N(CH_3)_2$] can be prepared by lithium aluminum hydride reduction of 8-carboxy-4b,8-dimethyl-12-isopropyl - 1,2,3,4,4a,4b,5,6,7,8,8a,9,10,10a - tetradecahydro-3,10a - ethenophenanthro[1,2-c]-1' - (5 - dimethylaminopentyl)-2',5'-pyrrolidinedione (Example 24) according to the manipulative procedures described above in Examples 26 and 27.

EXAMPLE 49

4b,8 - dimethyl - 8-hydroxymethyl-12-isopropyl-1,2,3,4,4a,4b,5,6,7,8,8a,9,10,10a - tetradecahydro-3,10a-ethenophenanthro[1,2-c] - 1' - (2-dimethylamino - 1,2-dimethylethyl)pyrrolidine [I; R is $CH_2OH$, X is $H_2$, Y is $CH(CH_3)CH(CH_3)$, N=B is $N(CH_3)_2$] can be prepared by lithium aluminum hydride reduction of 8-carboxy - 4b,8 - dimethyl-12-isopropyl-1,2,3,4,4a,4b,5,6,7,8,8a,9,10,10a - tetradecahydro - 3-,10a-ethenophenanthro[1,2-c] - 1'-(2 - dimethylamino-1,2-dimethylethyl)-2',5'-pyrrolidinedione (Example 25) according to the manipulative procedures described above in Examples 26 and 27.

EXAMPLE 50

4b,8 - dimethyl - 8-hydroxymethyl-12-isopropyl-1,2,3,4a,4b,5,6,7,8,8a,9,10,10a - tetradecahydro-3,10a-ethenophenanthro[1,2-c] - 1' - (2-diethylaminoethyl)-2',5',-pyrrolidinedione [I; R is $CH_2OH$, X is O, Y is $CH_2CH_2$, N=B is $N(C_2H_5)_2$] can be prepared by rapidly adding a mixture of 8-carbomethoxy-4b,8-dimethyl-12-isopropyl-1,2,3,4,4a,4b,5,6,7,8,8a,9,10,10a - tetradecahydro-3,10a-ethenophenanthro[1,2-c] - 1'- (2 - diethylaminoethyl)-2',5'-pyrrolidinedione (Example 8) and ethyl alcohol to an excess of molten sodium, alone, or in an inert solvent such as toluene or xylene. The reaction mixture is stirred vigorously until the reaction has ceased, the excess sodium carefully decomposed by adding ethanol, and the product isolated by filtration or extraction.

EXAMPLE 51

8 - carboxy - 4b,8-dimethyl-12-isopropyl-1,2,3,4,4a,4b,5,6,7,8,8a,9,10,10a - tetradecahydro - 3,10a-ethenophenanthro[1,2-c] - 1' - (2-diethylaminoethyl)-2',5'-pyrrolidinedione (Example 1) can be caused to react with thionyl chloride to give the corresponding acid chloride. The latter then can be caused to react with sodium borohydride to give 4b,8-dimethyl-8-hydroxymethyl-12-isopropyl - 1,2,3,4,4a,4b,5,6,7,8,8a,9,10,10a - tetradecahydro-3,10a - ethenophenanthro[1,2-c]-1'-(2-diethylaminoethyl)-2',5'-pyrrolidinedione, the same product as obtained above in Example 50.

EXAMPLE 52

8 - carboxy - 4b,8-dimethyl-12-isopropyl-1,2,3,4,4a,4b,5,6,7,8,8a,9,10,10a - tetradecahydro - 3,10a-ethenophenanthro[1,2-c]-1'-(2-diethylaminoethyl)pyrrolidine [I; R is COOH, X is $H_2$, Y is $CH_2CH_2$, N=B is $N(C_2H_5)_2$] can be prepared by vigorously stirring at room temperature a mixture of 4b,8-dimethyl-8-hydroxymethyl-12-isopropyl - 1,2,3,4,4a,4b,5,6,7,8,8a,9,10,10a - tetradecahydro - 3,10a - ethenophenanthro[1,2-c]-1'-(2-diethylaminoethyl)pyrrolidine (Example 26) and chromic acid in sulfuric acid solution. The product is isolated by filtration or extraction in the usual manner.

EXAMPLE 53

8 - carbomethoxy - 4b,8-dimethyl-12-isopropyl-1,2,3,4,4a,4b,5,6,7,8,8a,9,10,10a - tetradecahydro-3,10a-ethenophenanthro[1,2-c] - 1'-(2-diethylaminoethyl)pyrrolidine [I; R is COOCH₃, X is H₂, Y is CH₂CH₂, N=B is N(C₂H₅)₂] can be prepared by causing 8-carboxy-4b,8-dimethyl - 12-isopropyl-1,2,3,4,4a,4b,5,6,7,8,8a,9,10,10a-tetradecahydro - 3,10a- ethenophenanthro[1,2-c]-1'-(2-diethylaminoethyl)pyrrolidine (Example 52) to react with an ethereal solution of diazomethane.

We claim:

1. A compound of the formula

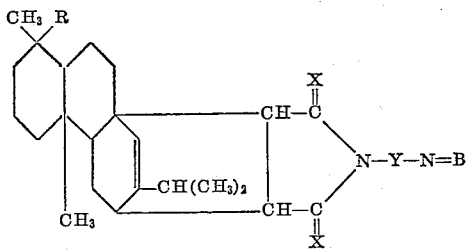

wherein R represents carboxy; X represents O, Y represents lower-alkylene; and N=B represents di-lower alkylamino.

2. A compound of the formula

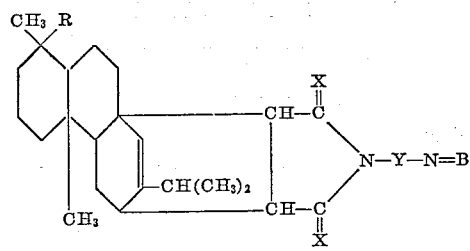

wherein R represents carboxy; X represents O; Y represents lower-alkylene; and N=B represents polymethylenimino having from 5 to 7 ring members.

3. A compound of the formula

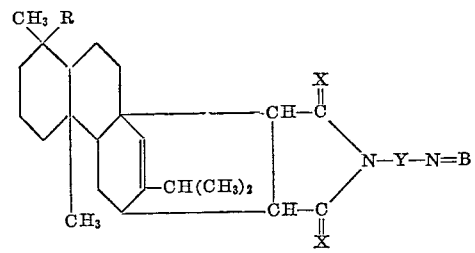

wherein R represents hydroxymethyl; X represents H₂; Y represents lower-alkylene; and N=B represents di-lower-alkylamino.

4. A compound of the formula

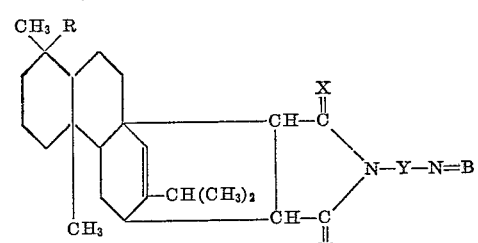

wherein R represents hydroxymethyl; X represents H₂; Y represents lower-alkylene; and N=B represents polymethylenimino having from 5 to 7 ring members.

5. 8 carboxy - 4b,8-dimethyl-12-isopropyl-1,2,3,4,4a,4b,5,6,7,8,8a,9,10,10a - tetradecahydro - 3,10a-ethenophenanthro[1,2-c] - 1' - (2-diethylaminoethyl)-2,5'-pyrrolidinedione.

6. 8 - carboxy - 4b,8 - dimethyl-12-isopropyl-1,2,3,4,4a,4b,5,6,7,8,8a,9,10-10a - tetradecahydro-3,10a-ethenophenanthro[1,2-c]-1'- [2-(4-morpholinyl)ethyl]-2',5'-pyrrolidinedione.

7. 8 - carboxy - 4b,8-dimethyl-12-isopropyl-1,2,3,4,4a,4b,5,6,7,8,8a,9,10,10a - tetradecahydro - 3,10a - ethenophenanthro[1,2-c] - 1' - (3-hexamethyleniminopropyl)-2',5'-pyrrolidinedione.

8. 8-carboxy - 4b,8 - dimethyl-12-isopropyl-1,2,3,4,4a,4b,5,6,7,8,8a,9,10,10a-tetradecahydro - 3,10a - ethenophenanthro[1,2-c] - 1' - (3-dimethylaminopropyl)-2',5'-pyrrolidinedione.

9. 8-carboxy - 4b,8 - dimethyl-12-isopropyl-1,2,3,4,4a,4b,5,6,7,8,8a,9,10,10a-tetradecahydro - 3,10a - ethenophenanthro[1,2-c]-1'-[3-(1 - pyrrolidyl)propyl]-2',5'-pyrrolidinedione.

10. 8-carboxy-4b,8-dimethyl-12-isopropyl-1,2,3,4,4a,4b,5,6,7,8,8a,9,10,10a-tetradecahydro - 3,10a - ethenophenanthro[1,2-c]-1'-[2-(1 - piperazinyl)ethyl]-2',5'-pyrrolidinedione.

11. 8-carboxy-4b,8-dimethyl-12-isopropyl-1,2,3,4,4a,4b,5,6,7,8,8a,9,10,10a-tetradecahydro - 3,10a - ethenophenanthro[1,2-c] - 1' - [2-(4-phenyl-1-piperazinyl)ethyl]-2',5'-pyrrolidinedione.

12. 4b,8 - dimethyl-8-hydroxymethyl-12-isopropyl-1,2,3,4,4a,4b,5,6,7,8,8a,9,10,10a-tetradecahydro-3,10a-ethenophenanthro[1,2-c]-1'-(2-diethylaminoethyl)pyrrolidine.

13. 4b,8 - dimethyl-8-hydroxymethyl-12-isopropyl-1,2,3,4,4a,4b,5,6,7,8,8a,9,10,10a-tetradecahydro-3,10a-ethenophenanthro[1,2-c] - 1' - [2-(4-morpholinyl)ethyl]pyyrolidine.

14. 4b,8 - dimethyl-8-hydroxymethyl-12-isopropyl-1,2,3,4,4a,4b,5,6,7,8,8a,9,10,10a-tetradecahydro-3,10a-ethenophenanthro[1,2-c]-1'-(3 - hexamethyleniminopropyl)pyrrolidine.

15. 4b,8-dimethyl-8 - hydroxymethyl-12-isopropyl-1,2,3,4,4a,4b,5,6,7,8,8a,9,10,10a-tetradecahydro - 3,10a - etheno phenanthro[1,2-c] - 1' - (3-dimethylaminopropyl)pyrrolidine.

16. 4b,8 - dimethyl-8-hydroxymethyl-12-isopropyl-1,2,3,4,4a,4b,5,6,7,8,8a,9,10,10a-tetradecahydro-3,10a-ethenophenanthro[1,2-c] - 1' - [3-(1-pyrrolidyl)propyl]pyrrolidine.

17. 4b,8 - dimethyl-8-hydroxymethyl-12-isopropyl-1,2,3,4,4a,4b,5,6,7,8,8a,9,10,10a-tetradecahydro-3,10a-ethenophenanthro[1,2-c] - 1' - [2-(4-phenyl-1-piperazinyl)ethyl] pyrrolidine.

18. A member of the group consisting of compounds of the formula wherein R represents a member of the group selected from carboxy, carbo-lower-alkoxy, hydroxymethyl and carboxylic acyloxymethyl; X represents a member of the group selected from H₂ and O; Y represents lower-alkylene; and N=B represents a member of the group consisting of di-lower-alkylamino, dicycloalkylamino in which the cycloalkyl has from 5 to 6 ring members, N-(cycloalkyl)-N-lower-alkylamino in which the cycloalkyl has from 5 to 6 ring members, polymethyleneimino having from 5 to 7 ring members, 4-morpholinyl, 1-piperazinyl, 4-hydrocarbon-1-piperazinyl in which the hydrocarbon has from 1 to 10 carbon atoms, di-(phenyl-lower-alkyl)-amino, and N-(phenyl-lower-alkyl)-N-lower-alkylamino and acid-addition salts and lower-alkyl, lower-alkenyl and monocarbocyclic aryl-lower-alkyl quaternary ammonium salts thereof.

19. The process for preparing a compound of the formula

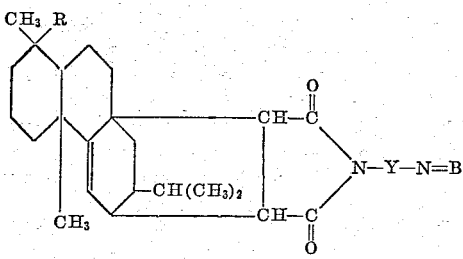

wherein R represents a member of the group selected from carboxy and carbo-lower-alkoxy; Y represents lower-alkylene; and N=B represents a member of the group consisting of di-lower-alkylamino, dicycloalkylamino in which the cycloalkyl has from 5 to 6 ring members, N-(cycloalkyl)-N-lower-alkylamino in which the cycloalkyl has from 5 to 6 ring members, polymethyleneimino having from 5 to 7 ring members, 4-morpholinyl, 1-piperazinyl, 4-hydrocarbon-1-piperazinyl in which the hydrocarbon has from 1 to 10 carbon atoms, di-(phenyl-lower-alkyl)amino, and N-(phenyl-lower-alkyl)-N-lower-alkylamino, which comprises reacting a member of the group consisting of maleopimaric acid and lower-alkyl esters thereof with a compound having the formula $H_2N-Y-N=B$.

20. The process for preparing a compound of the formula

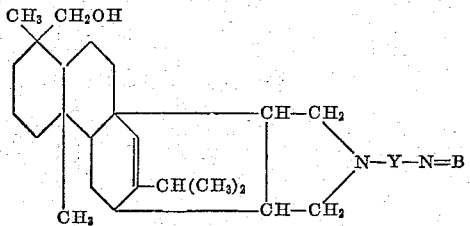

wherein Y represents lower-alkylene and N=B represents a member of the group consisting of di-lower-alkylamino, dicycloalkylamino in which the cycloalkyl has from 5 to 6 ring members, N-(cycloalkyl)-N-lower-alkylamino in which the cycloalkyl has from 5 to 6 ring members, polymethyleneimino having from 5 to 7 ring members, 4-morpholinyl, 1-piperazinyl, 4-hydrocarbon-1-piperazinyl in which the hydrocarbon has from 1 to 10 carbon atoms, di-(phenyl-lower-alkyl)amino, and N-(phenyl-lower-alkyl)-N-lower-alkylamino, which comprises reacting a compound having the formula

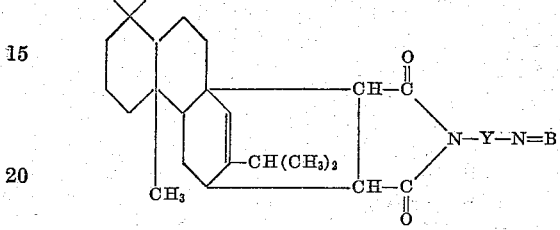

wherein R represents a member of the group selected from carboxy and carbo-lower-alkoxy, and Y and N=B have the meanings given above, with lithium aluminum hydride.

References Cited in the file of this patent

UNITED STATES PATENTS 2,359,980     Fleck _____ Oct. 10, 1944
2,781,378     Mannheimer _____ Feb. 12, 1957

OTHER REFERENCES

Gaylor: "Reduction With Complex Metal Hydrides" (1956), Interscience Publishers, Inc., New York.

UNITED STATES PATENT OFFICE
CERTIFICATE OF CORRECTION

Patent No. 3,135,749                                June 2, 1964

Raymond O. Clinton et al.

It is hereby certified that error appears in the above numbered patent requiring correction and that the said Letters Patent should read as corrected below.

Column 4, line 20, for "The" read -- They --; line 67, for "sulfonic" read -- sulfuric --; column 8, line 34, for "L is" read -- Y is --; column 9, line 7, for "dimethylaminopyroply" read -- dimethylaminopropyl --; line 11, for "dimethylaminopyropylamine" read -- dimethylaminopropylamine --; column 14, between lines 66 and 67, insert -- EXAMPLE 41 --; column 15, line 20, for "[2-(2-phenylethyl)" read -- [2-bis(2-phenylethyl) --.

Signed and sealed this 3rd day of November 1964.

(SEAL)
Attest:

ERNEST W. SWIDER                                EDWARD J. BRENNER
Attesting Officer                                    Commissioner of Patents